United States Patent Office 3,377,345
Patented Apr. 9, 1968

3,377,345
SUBSTITUTED 3,4,5,6 - TETRAHYDRO - 2H - 1,3,4-OXADIAZIN-2-ONE COMPOUNDS AND METHOD OF PREPARATION THEREOF
Donald L. Trepanier, Indianapolis, Ind., and Guy H. Harris, Concord, Calif., assignors to The Dow Chemical Company, Midland, Mich., a corporation of Delaware
No Drawing. Filed Sept. 23, 1966, Ser. No. 581,449
6 Claims. (Cl. 260—244)

This invention is directed to novel 3,4,5,6-tetrahydro-2H-1,3,4-oxadiazin-2-one compounds and to a method for their preparation. More specifically, the compounds of the present invention are characterized by the formula:

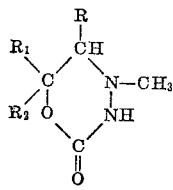

In this and succeeding formulae, R represents hydrogen, methyl, ethyl or propyl, $R_1$ represents hydrogen or methyl and $R_2$ represents phenyl or lower alkyl of from 3 to 5 carbon atoms, inclusive.

The oxadiazinone compounds of the present invention are white crystalline solids that are only slightly soluble in water and soluble in acetone, benzene and chlorinated hydrocarbons. The novel compounds have been found useful pharmacologically in studying the activity of drugs in the central nervous system of rodents and particularly in combating reserpine-induced depression and in prolonging the stimulation produced by the administration of dihydroxyphenylalanine and amphetamine. Thus, the oxadiazinone compounds of the invention act as monoamine oxidase inhibitors and may be employed as antidepressants or psychic energizers. The novel compounds have also shown activity as anticonvulsants. One of the novel compounds, 3,4,5,6-tetrahydro-4,5-dimethyl - 6 - phenyl - 2H - 1,3,4 - oxadiazin - 2 - one, has been found to be particularly active and is preferred for pharmacological applications. With respect to the above-described oxadiazinone compound, the levorotatory isomer is preferred over the dextrorotatory isomer because of its greater activity as hereinafter described.

The new oxadiazinone compounds are prepared by reacting an unsymmetrically substituted hydrazine characterized by the formula

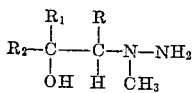

with methyl chlorothiolformate. The reaction is carried out in the presence of an inert organic solvent such as toluene, methylene chloride, chlorobenzene, chloroform, ether or benzene, and in the presence of a hydrogen chloride acceptor such as trimethylamine, triethylamine or pyridine.

Representative hydrazines which may be employed as starting materials include 1-methyl-1-(isopropyl-2-hydroxy-3, 3-dimethyl-n-propyl)hydrazine, 1-methyl-1-(2-hydroxy-2,4,4-trimethyl-n-pentyl)hydrazine and N-amino-ephedrine.

The reaction proceeds with the formation of a methyl-thiolformic acid substituted hydrazide. The acid hydrazide intermediate undergoes cyclization with the elimination of methyl mercaptan.

The reaction proceeds readily at temperatures from room temperature to the boiling temperature of the mixture and is preferably carried out at reflux temperatures. The proportions of the reactants to be employed are not critical, some of the desired products being obtained when combining the reactants in any proportion. However, one mole of methyl chlorothiolformate is consumed for each mole of the hydrazine compound and each mole of hydrogen chloride acceptor, and at least such proportions are preferred.

In a convenient procedure, the hydrogen chloride acceptor and hydrazine compound are mixed with the inert organic solvent and the methyl chlorothiolformate is added to this mixture.

The reaction may be carried to completion at room temperature after several hours. In a preferred method of preparation, the reaction mixture is heated to reflux, after which the acid hydrazide is collected by washing and evaporation. The oily hydrazide residue is heated at about 160° to 190° C., after which the product is separated from the residue by such conventional procedures as extraction, evaporation, recrystallization and filtration.

In other operations, the product may be separated from the initial reaction mixture by such conventional procedures as evaporation or extraction. The product separated as described above may be further purified by such conventional techniques as washing, filtration or recrystallization.

The following examples are illustrative of the invention but are not intended to be limiting.

EXAMPLE 1

Methyl chlorothiolformate (22.1 grams; 0.2 mole) was added dropwise to a stirred mixture of N-amino-*l*-ephedrine (36.0 grams; 0.2 mole) and triethylamine (28 milliliters) in 500 milliliters of ether. The reaction mixture was thereafter stirred for 18 hours at a temperature of about 25° C. Following the stirring period, the mixture was washed with three successive 150 milliliter portions of water and the water discarded. The reaction mixture was then extracted with three successive 150 milliliter portions of dilute aqueous hydrochloric acid. The combined hydrochloric acid extracts were made basic by the addition of potassium carbonate whereupon the product precipitated. The 3,4,5,6-tetrahydro-4,5-dimethyl-6-phenyl-2H-1,3,4,-oxadiazin-2-one precipitate was recrystallized from isopropyl ether. The recrystallized product was found to melt at 119°–120° C. This product was found to contain 64.06 percent by weight of carbon, 6.94 percent of hydrogen and 13.74 percent of nitrogen, by analysis, as compared to percentages of 64.33, 6.69 and 13.59, respectively, calculated for the named structure. A 4 percent (weight/volume) benzene solution of the oxadiazinone product was found to have a specific rotation, $[\alpha]_D^{25}$, of −51° to −53° C.

EXAMPLE 2

Methyl chlorothiolformate (55 grams) was added dropwise to a stirred mixture of N-amino-*l*-ephedrine (90 grams), triethylamine (51 grams) and benzene (500 milliliters). The reaction mixture was then heated to reflux temperature for one hour with stirring. The mixture was cooled, washed several times with water, dried over anhydrous sodium sulfate and evaporated in vacuo. The residue was mixed with isopropyl ether and filtered. The filtrate was evaporated in vacuo and the residual oil heated at 160°–170° C. for about 1.5 hours. The heating was accompanied by the evolution of methyl mercaptan which was trapped in aqueous potassium hydroxide. The residue was extracted with successive portions of isopropyl ether. On cooling, the 3,4,5,6-tetrahydro-4,5-dimethyl - 6 - phenyl-2H-1,3,4-oxadiazin-2-one precipitated as white crystals. The product was recrystallized from isopropanol and isopropyl ether and found to melt at 119°–120° C.

EXAMPLE 3

Methyl chlorothiolformate (6.1 grams; 0.0550 mole) was dissolved in 25 milliliters benzene and added dropwise to a stirred mixture of N-amino-$d$-ephedrine (10 grams; 0.0550 mole), triethylamine (5.7 grams; 0.056 mole) and 31 milliliters benzene. The reaction mixture was thereafter stirred and heated under reflux for three hours. After cooling to room temperature, the reaction mixture was washed with water to remove triethylamine hydrochloride. The washed mixture was then dried over anhydrous magnesium sulfate. The dried benzene solution was evaporated under reduced pressure and 11.8 grams of oily methylthiolformic acid hydrazide was obtained (yield 83.4 percent). The hydrazide residue was heated in an oil bath at 160°–170° C. for two hours with the evolution of methyl mercaptan gas. The residue was dissolved in hot isopropyl ether and precipitated from the isopropyl ether on prolonged cooling. The crystals were suction filtered and again recrystallized from a mixture of isopropyl ether and isopropyl alcohol. The $d$-3,4,5,6-tetrahydro-4,5-dimethyl-6-phenyl-2H-1,3,4-oxadiazin-2-one product was found to melt at 119°–120° C. This product was found to contain 64.21 percent by weight of carbon and 6.80 percent by weight of hydrogen, by analysis, as compared to percentages of 64.06 and 6.84, respectively, calculated for the named structure. A four percent (weight/volume) solution of the oxadiazinone product in benzene was found to be dextrorotatory, having a specific rotation, $[\alpha]_D^{25}$ of +51° to +53°.

The $d$-3,4,5,6-tetrahydro-4,5-dimethyl-6-phenyl-2H-1,3,4-oxadiazin-2-one product can also be prepared using substantially the same procedure as Example 1 using N-amino-$d$-ephedrine.

EXAMPLE 4

Methyl chlorothiolformate (9.5 grams; 0.086 mole) was dissolved in 44 milliliters of benzene and added dropwise to a stirred solution of 1-methyl-1(1-isopropyl)-2-hydroxy-3,3-dimethyl-n-propyl hydrazine (15 grams; 0.086 mole) and triethylamine (9.1 grams; 0.09 mole) in 44 milliliters of benzene. Thereafter, the mixture was stirred and refluxed for three hours. After cooling, the reaction mixture was washed four times with water and the water discarded. The reaction mixture was then dried overnight over anhydrous sodium sulfate. The dried reaction mixture was evaporated under reduced pressure to yield 15.6 grams of acid hydrazide residue. This residue was heated in an oil bath at about 180° C. for two hours and then dissolved in isopropyl ether. On cooling, the 3,4,5,6-tetrahydro-4-methyl-5,6-diisopropyl-2H-1,3,4-oxadiazin-2-one product precipitated and was separated by filtration. The crystalline product was washed with cold isopropyl ether and again recrystallized from isopropyl ether and found to melt at 118°–120° C. This product was found to contain 60.79 percent by weight of carbon and 10.24 percent of hydrogen, by analysis, as compared to the percentages of 59.97 and 10.06, respectively, calculated for the named structure.

EXAMPLE 5

1-methyl-1-(2-hydroxy-2,4,4-trimethyl-n-pentyl) hydrazine (8.0 grams; 0.046 mole), 10 milliliters of triethylamine and 50 milliliters of benzene were mixed together and stirred. A solution of methyl chlorothiolformate (6.6 grams; 0.06 mole) in 20 milliliters of benzene was added dropwise to the stirred solution. The resulting mixture was stirred and refluxed for 18 hours after the addition was completed. The mixture was cooled, 150 milliliters of chloroform was added and the resulting mixture was washed twice with water, twice with sodium hydroxide solution and twice again with water. The washed mixture was dried over anhydrous magnesium sulfate and concentrated in vacuo to leave 10 grams of tan oily hydrazide residue. The oily hydrazide residue was heated in an oil bath at from about 180° to about 190° C. for 2.5 hours. The oily residue, which became granular on prolonged standing, was triturated with isopropyl ether which produced a crystalline precipitate. The precipitate was separated by filtration and recrystallized from isopropyl ether. The filtrate was concentrated and the resulting precipitate was combined with the crystals separated as described above. The combined 3,4,5,6-tetrahydro-4,6-dimethyl-6-neopentyl-2H-1,3,4-oxadiazin-2-one product was found to melt at 119°–120.5° C. The product was found to contain 60.62 percent by weight of carbon and 10.25 percent of hydrogen, by analysis, as compared to the percentages of 59.97 and 10.06, respectively, calculated for the named structure.

The levo-3,4,5,6-tetrahydro-4,5-dimethyl-6-phenyl-2H-1,3,4-oxadiazin-2-one of the present invention was administered to mice at a dosage rate of 100 milligrams per kilogram by intraperitoneal injection. Injections of such dosages were carried out succssively at intervals of 24 and 5 hours for a total of two doses prior to challenging with 3,4-dihydroxyphenyl-$l$-alanine (DOPA). Five mice were so treated with the oxadiazinone compound and a control group of five mice was similarly treated with saline solution. Five hours after the last dosage of the oxadiazinone compound, DOPA was administered to each mouse at a dosage rate of 200 milligrams per kilogram of body weight by intraperitoneal injection. The spontaneous motor activity of the mice was then observed. One hour after the administration of DOPA, the mice treated with the oxadiazinone compound showed a marked increase in spontaneous motor activity. During the same period of time, the control mice treated with saline showed a decrease in activity. Two hours after the administration of DOPA, the control mice showed little spontaneous motor activity while the treated mice remained active. In other operations, the above-named oxadiazinone compound of the present invention was administered to mice at a dosage rate of 100 milligrams per kilogram by intraperitoneal injection. Injections of such dosages were carried out successively at intervals of 24 and 5 hours for a total of two doses prior to challenging with $d$-1-phenyl-2-aminopropane sulfate ($d$-amphetamine sulfate). A similar group of mice was similarly pretreated with saline solution to serve as a control group. Five hours after the last dosage of the oxadiazinone compound, amphetamine sulfate was administered to each mouse at a dosage rate of 1.5 milligrams per kilogram by intraperitoneal injection. The spontaneous motor activity of the mice was then observed. The mice treated with oxadiazinone compound showed a marked increase in spontaneous motor activity during the first hour after the administration of amphetamine sulfate. During the same period of time, the control mice treated with the saline solution showed a brief increase in motor activity followed by a decline in spontaneous motor activity. Two hours after the administration of amphetamine sulfate, the control mice showed little or no motor activity, while the mice treated with the oxadiazinone compound remained active.

In other operations, levo-3,4,5,6-tetrahydro-4,5-dimethyl-6-phenyl-2H-1,3,4-oxadiazin-2-one was administered to rats at a dosage rate of 100 milligrams per kilogram by intraperitoneal injection. The injections were carried out at intervals of 24 hours and 1 hour before a four milligram per kilogram intraperitoneal injection of reserpine was given. The administration of four milligams per kilogram of reserpine intraperitoneally to rats results in a progression of signs starting with drooping of the eyelids (ptosis) and pilo-erection and culminating in a generalized depression with decreased spontaneous motor activity and decreased responsiveness to auditory or tactile stimuli. One hour after challengeing with reserpine, an untreated group of rats all showed ptosis and marked depression. The animals treated with the oxadiazinone compound showed no ptosis, no depression and no hyper-irritability.

In other operations, mice were treated with intraperitoneal injections of *l*-3,4,5,6-tetrahydro-4,5-dimethyl-6-phenyl-2H-1,3,4-oxidiazin-2-one at a dosage of 20 milligrams per kilogram daily for four consecutive days. Similar groups of mice were similarly treated with *d*-3,4,- 5,6-tetrahydro - 5,6 - dimethyl-6-phenyl-2H-1,3,4-oxadiazin-2-one. Twenty-four hours after the last such dose, the mice were given an intraperitoneal injection of reserpine at a dosage of 5 milligrams per kilogram. Two hours later, the mice were subjected to an intravenous infusion of a 0.5 percent solution of pentylenetetrazol at a rate of 0.2 milliliter per minute. Reserpine-treated mice which had not been pretreated with an oxadiazinone compound were used as a check. When untreated mice are pretreated with reserpine and given an infusion of pentylenetetrazol solution, extensor convulsions and death usually occur within 60 seconds. The mice pretreated with the levo-oxadiazinone compound survived an average of 2.3 times as long as the untreated mice. The mice treated with the dextrooxadiazinone compound survived an average of 1.5 times as long as the untreated mice.

In other standard pharmacological tests, 3,4,5,6-tetrahydro - 4,5 - dimethyl-6-phenyl-2H-1,3,4-oxadiazin-2-one was administered to three groups of dogs by intravenous, subcutaneous and oral routes, respectively, and was found to reverse the characteristic fall in blood pressure following an administration of reserpine. Such responses have been found to be characteristic of compounds which have demonstrated antidepressant pharmacological activity in vivo (Journal of Pharmacology, vol. 119, p. 453, 1957).

In other operations, a group of ten mice was treated with the 3,4,5,6-tetrahydro-4,5-dimethyl-6-phenyl-2H,1,- 3,4-oxadiazin-2-one compound of Example 1. The mice were administered 100 milligrams per kilogram by intraperitoneal injection on each of three consecutive days. A second group of nine mice was similarly treated with the 3,4,5,6-tetrahydro - 4,6 - dimethyl-6-neopentyl-2H-1,3,4-oxadiazin-2-one compound of Example 5. A third group of ten mice was similarly treated with the 3,4,5,6-tetrahydro-4-methyl-5,6-diisopropyl - 2H - 1,3,4-oxadiazin-2-one compound of Example 4. One hour after the last dose, the mice were challenged with strychnine by a 1.5 milligram per kilogram intraperitoneal injection of strychnine sulfate. This dose of strychnine usually results in 100 percent lethality within two hours in untreated mice. Of the ten mice treated with 3,4,5,6-tetrahydro-4,5-dimethyl-6-phenyl-2H,1,3,4-oxadiazin - 2 - one, seven survived for at least two hours after challenging with strychnine. Of the mice treated with 3,4,5,6-tetrahydro-4,6-dimethyl-6-neopentyl-2H-1,3,4-oxadiazin-2-one, three survived for two hours and three of the mice treated with 3,4,5,6-tetrahydro-4-methyl - 5,6 - diisopropyl-2H-1,3,4-oxadiazin-2-one survived for two hours.

The unsymmetrically substituted hydrazines employed as starting materials herein may be prepared according to known procedures. For example, 1-ethyl-1-(2-hydroxy-2,4,4-trimethyl-n-pentyl)hydrazine is prepared in the following manner: A mixture of 1,2-epoxy-2,4,4-trimethyl-pentane (23 grams; 0.18 mole), methylhydrazine (8.3 grams; 0.18 mole) and two drops of aqueous 1 N sodium hydroxide solution were refluxed for 24 hours. The mixture was distilled under vacuum and the 1-methyl-1-(2-hydroxy-2,4,4-trimethyl-n-pentyl)hydrazine product was collected as a fraction boiling at 133°–135° C. at a pressure of 3.5 millimeters of mercury. The structure of the product was confirmed by infrared spectroscopy.

We claim:
1. The substituted 3,4,5,6-tetrahydro-2H-1,3,4-oxadiazin-2-one compound corresponding to the formula

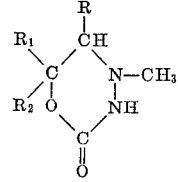

wherein R represents a member of the group consisting of hydrogen, methyl and propyl, $R_1$ represents a member of the group consisting of hydrogen and methyl and $R_2$ represents a member of the group consisting of phenyl and lower alkyl of from 3 to 5 carbon atoms, inclusive.

2. The oxadiazinone compound of claim 1 wherein the compound is 3,4,5,6-tetrahydro-4,5-dimethyl-6-phenyl-2H-1,3,4-oxadiazin-2-one.

3. The oxadiazinone compound of claim 1 wherein the compound is 3,4,5,6-tetrahydro-4-methyl-5,6-diisopropyl-2H-1,3,4-oxadiazin-2-one.

4. The oxadiazinone compound of claim 1 wherein the compound is 3,4,5,6-tetrahydro-4,6-dimethyl-6-neopentyl-2H-1,3,4-oxadiazin-2-one.

5. A method for preparing a substituted 3,4,5,6-tetrahydro-2H-1,3,4-oxadiazin-2-one compound which comprises blending methyl chlorothiolformate and a hydrogen chloride acceptor with a substituted hydrazine of the formula

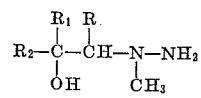

wherein R represents a member of the group consisting of hydrogen, methyl and propyl, $R_1$ represents a member of the group consisting of hydrogen and methyl and $R_2$ represents a member of the group consisting of phenyl and lower alkyl of from 3 to 5 carbon atoms, inclusive, for a time sufficient to form the 3,4,5,6-tetrahydro-2H-1,3,4-oxadiazin-2-one product and separating the thus-formed oxadiazinone product from the reaction mixture.

6. A method for preparing a substituted 3,4,5,6-tetrahydro-2H-1,3,4-oxadiazin-2-one compound which comprises blending methyl chlorothiolformate and a hydrogen chloride acceptor with a substituted hydrazine of the formula

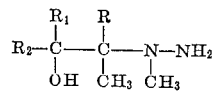

wherein R represents a member of the group consisting of hydrogen, methyl and propyl, $R_1$ represents a member of the group consisting of hydrogen and methyl and $R_2$ represents a member of the group consisting of phenyl and lower alkyl of from 3 to 5 carbon atoms, inclusive, for a time sufficient to form the methylthiolformic acid hydrazide of said hydrazine, separating the said hydrazide from the reaction mixture, heating said hydrazide to a temperature of from about 160° to 190° C. and thereafter separating the resulting substituted 3,4,5,6-tetrahydro-2H-1,3,4-oxadiazin-2-one from the residue.

References Cited

Dox: Jour. Amer. Chem. Soc., vol. 48, pages 1951–4 (1926).

Rosenblum et al.: Jour. Amer. Chem. Soc., vol. 85, pages 3874–8 (1963).

JOHN D. RANDOLPH, *Primary Examiner.*

N. TROUSOF, *Assistant Examiner.*